May 25, 1937.  E. H. SMYTHE  2,081,644
ANTIRATTLING GEAR
Filed Sept. 26, 1936
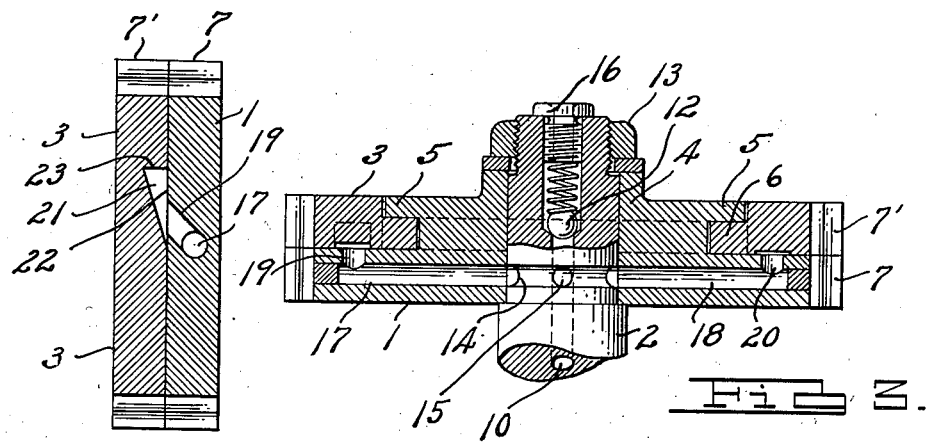
INVENTOR.
Ethelbert H. Smythe
BY
ATTORNEY.

Patented May 25, 1937

2,081,644

UNITED STATES PATENT OFFICE 2,081,644

ANTIRATTLING GEAR

Ethelbert Hamilton Smythe, Detroit, Mich.

Application September 26, 1936, Serial No. 102,673

6 Claims. (Cl. 74—440)

This invention relates to anti-rattling gears, the purpose being to provide a gear for use in various types of installations as, for instance, transmission gearing of an automobile, so constructed that no back lash will occur between the teeth of the gear and the companion gear engaging therewith.

The teeth of the usual gears and pinions are constructed to provide for clearance which increases due to wear in use resulting in an increasing and undesirable noise in operation.

The object of this invention is to provide a two-part gear for meshing with a pinion, both of which gear parts are formed with complemental teeth that may register and the combined end to end length of which is approximately the same as the teeth of the pinion meshing therewith in association with which I provide a hydraulic means for causing a relative rotation of one part of the two-part gear to the other and thus the two-part teeth of the gear, in engaging between the teeth of the pinion, respectively engage the side faces of the adjacent teeth of the pinion.

A further feature and object of the invention is to provide a two-part gear for use in conjunction with an internal combustion engine in which the wearing parts are supplied with oil under pressure as by means of a pump, a part of the conduits supplied with oil under pressure leading through one of the gear parts and discharging to between the parts to recesses having abutments against which the oil applies pressure to cause relative rotation of the other gear part to offset the teeth.

These and other objects and novel features of the invention are hereinafter more fully described and claimed, and the preferred form of construction of a gear embodying my invention is shown in the accompanying drawing in which—

Fig. 1 is an end elevation of the two-part gear and portion of a pinion meshing therewith.

Fig. 2 is a section taken on line 2—2 of Fig. 1 showing the oil channels in one part of the gear and recesses in the other whereby oil under pressure tends to rotate the recessed gear part relative to the other part.

Fig. 3 is a section taken on line 3—3 of Fig. 1.

The gear embodying my invention is formed of two parts 1 and 3, the part 1 having a hub secured to the shaft 2 by which it is driven and the other part 3 of the gear is rotatably mounted on and in face contact with the relatively fixed gear part 1. The hub 4 of the gear part 1 is preferably provided with at least three arcuate portions 5 spaced circumferentially about the hub and these portions 5 are undercut to provide a groove to receive corresponding tongues 6 of the gear 3. The gear part 3 may be mounted in the desired relationship with the gear part 1 by introducing the portions 6 of the gear part 3 between the portions 5 of the gear part 1 whereupon the gear part 3 is rotated so that the tongues 6 lie beneath the projections 5 of the gear part 1 and sustain the same in position. Both these gear parts have complemental teeth 7 and 7' and these are brought to alignment and together mesh between the teeth 8 of the pinion 9.

The shaft 2 on which the gears are mounted is formed with an oil passageway 10 supplied with oil under pressure in any approved manner. There is a ball check valve 12 in the passageway 10 at the end of the shaft supported by a spring 13 under such tension that oil may not discharge through the shaft except at certain pressure. The shaft has a circumferential groove 14 which is open at at least one point to the passageway 10 in the shaft 2 by the radial passageway 15. There is an apertured plug 16 at the end of the shaft which supports the check valve opening and tension of the spring limits the oil pressure. The gear 1 has at least two radial passageways 17 and 18 registering at one end with the groove 14 and extending to near the periphery of the gear and terminating in a transverse passageway 19 and 20 for the respective passageways 17 and 18. The transverse passageways open through the inner face of the gear 1 as will be clearly understood from Figs. 2 and 3. The inner and contacting face of the gear 3 has recesses 21 formed with an inclined side wall 22 and a wall 23 at a right angle to the inner face of the gear and the channels 19 and 20 open to these respective recesses. Oil feeding under pressure through the several passageways to the recesses 21 tends to rotate the gear part 3 relative to the gear part 1 and thus offset the teeth 7 and 7' to the extent permitted by the space between the teeth of the driving pinion 9. The arrangement thus provides for limited pressure contact of the teeth of the two parts of the driven gear with the teeth of the pinion and prevents back lash or noise in the operation of the gear.

For general purposes, the oil may be supplied under pressure in any convenient way (not here shown). In use of the gear in parts of a transmission mechanism, timing gear, or other gear parts associated with an internal combustion engine of an automobile, the passageway 10 is to be understood as being connected with a branch of the oil supplying conduits commonly provided in such character of engine construction, which conduits in general lead to various bearings to with certainty maintain the bearings oiled. The conduit 10 being connected with such supply source will be free from oil under pressure when the engine is not in operation. Upon initially starting the engine, oil will be indirectly transmitted to the gear parts when sufficient pressure has been developed in the oil conduit 10 to unseat the ball check valve 12. Oil not only flows through the apertured plug 16 but also flows through the passageway 10, 17, 18, 19 and 20 to the recesses 21 of the gear part 3 tending to rotate the same slightly relative to the gear part 1 as may be permitted by the space between the teeth of the pinion with which it meshes. By providing for a release of oil pressure, the pressure between the teeth of the two-part gear and the pinion is sufficient to prevent back lash but insufficient to cause a grinding noise, or "growl" as it is sometimes termed, commonly occurring in gears having fixed teeth.

There is but slight movement of the gear part 3 under influence of hydraulic pressure due to the limitation of movement by the space between the pinion teeth and thus the inwardly extending lug portions 6 of the gear 3 do not in operation move sufficiently to pass from beneath the outwardly projecting portions 3 extending thereover but these portions 5 of the gear 1 are so relatively spaced that the portion 6 can, in the assembly of the gear parts, be positioned firstly between the portions 5 of the gear part 1 and then rotated to bring the portion 6 beneath the portions 5 and thus align the recesses 21 with the transverse passageways 19 and 20 of the gear part 1 and the gear parts 1 and 3 are retained in this operative relationship by the teeth of the pinion 9 meshing therewith.

From the foregoing description, it will be evident that the structure described is of such character as to secure the various objects of the invention and that the device is comparativey simple and inexpensive and naturally effective in operation.

Having thus briefly described my invention, its utility and mode of operation, what I claim and desire to secure by Letters Patent of the United States is—

1. An anti-rattling gear comprising a two-part toothed gear having the parts thereof in face to face relationship, one of said parts being revoluble relative to the other to offset the teeth for the purpose stated, and hydraulic means for causing rotation of the rotatable part relative to the other.

2. An anti-rattling gear comprising a two-part gear having the parts thereof in a face to face relationship, said parts having complemental teeth and one of the said parts being revolubly mounted on the other to offset the respective teeth for the purpose stated, and hydraulic means for causing rotation of one said part relative to the other.

3. An anti-rattling gear comprising a gear having two parts in a face to face relationship, the two parts having complemental teeth and one of the said parts being revoluble relative to the other, said other part having passageways opening through the face thereof contacting the face of the revoluble part, the first part having recesses opening through the face thereof and formed with an abutment at a right angle to the contacting faces of the two gear parts, and means for providing fluid under pressure to the said passageways to engage the said abutments and cause the rotatable gear to turn in respect to the other gear part to offset the teeth thereof whereby, in association with another toothed gear, the offset teeth respectively engage opposite side faces of the teeth of the gear between which they engage.

4. An anti-rattling gear comprising a gear formed of two similar parts provided with complemental teeth and lying in face to face relationship, one of the said gear parts having a hub for attachment to a shaft and provided with extending lugs in spaced relation to the adjacent side face of the gear part, the other of said gear parts being relatively revoluble and having a central aperture provided with similar inwardly extending lugs for engagement in the space between the lugs of the said hub and adjacent face of the first gear part whereby the gear parts are held in a close face to face relationship, the said shaft having a passageway and the hubbed gear having radial passageways opening thereto at one end and extending to near the periphery and opening at the other end through the face thereof in contact with the rotatable gear, said revoluble gear part having recesses registering with the said opening of the passageways through the face of the other gear part when the lugs of the revoluble gear are in position between the lugs of the hub, the said recesses being formed with a surface inclined to the contacting faces of the gear and an abutment at a right angle thereto, and means for supplying oil under pressure through the passageways to engage the abutments of the recesses and thereby turn the revoluble gear in respect to the first gear to thereby offset the teeth of the revoluble gear parts in respect to the fixed gear part.

5. An anti-rattling gear for use in association with an internal combustion engine driven gear set, including a pump and conduits for oil to the various engine parts, said gear including a shaft having a passageway communicating with the said oil conduits, said passageway having an opening to atmosphere, a spring pressed valve normally closing the passageway to atmosphere, whereby, when the engine is in operation, oil under pressure determined by the spring tension is delivered to the passageway, the said two gear parts being in a face to face relationship and having complemental teeth, one of the gear parts being rotatable relative to the other whereby the teeth of the one may be offset in respect to the teeth of the other part, the one gear part having oil passageways communicating with the said passageway of the shaft and opening through the face of said gear part in contact with the other part, said other part having recesses registering with the openings of the oil passageways of the other gear part providing a construction in which oil discharges under limited pressure to the passageways and recesses of the respective gear parts and turns the rotatable gear part relative to said other gear part.

6. An anti-rattling gear comprising a two-part gear, the two parts being in face to face relationship and having complemental teeth, one of said parts being revoluble relative to the other to offset the respective teeth for the purpose described, means responsive to hydraulic pressure for causing rotation of the rotatable gear part relative to the other, and means limiting the hydraulic pressure to which the gear parts may be subjected.

ETHELBERT HAMILTON SMYTHE.